United States Patent [19]
Magle et al.

[11] Patent Number: 5,513,080
[45] Date of Patent: Apr. 30, 1996

[54] INDIRECT LIGHTING SYSTEM FOR ROLLER SKATES AND SKATEBOARDS

[76] Inventors: Thomas O. Magle, 741 SW. 9th St. #106; Richard Earney, 978 SW. 10th Dr., Apt. 3, both of Pompano Beach, Fla. 33060

[21] Appl. No.: 366,874

[22] Filed: Dec. 30, 1994

[51] Int. Cl.⁶ .................................................. F21L 15/08
[52] U.S. Cl. ........................... 362/103; 362/253; 362/61; 280/11.23; 280/811
[58] Field of Search .............................. 362/103, 61, 253; 36/137, 115; 280/11.23, 11.22, 11.19, 811, 816

[56] References Cited

U.S. PATENT DOCUMENTS

| | | | |
|---|---|---|---|
| D. 268,195 | 3/1983 | Kalish | D21/226 |
| D. 312,137 | 11/1990 | Brown | D26/39 |
| D. 316,287 | 4/1991 | Incze et al. | D21/224 |
| 4,240,132 | 12/1980 | Wickman | 362/103 |
| 4,367,515 | 1/1983 | Beard | 362/103 |
| 4,648,610 | 3/1987 | Hegyi | 280/11.19 |
| 4,991,066 | 2/1991 | McCowan | 362/61 |
| 5,067,058 | 11/1991 | Standley | 362/83.3 |
| 5,132,883 | 7/1992 | La Lumandier | 362/81 |
| 5,278,733 | 1/1994 | St. Thomas | 362/78 |
| 5,285,586 | 2/1994 | Goldston et al. | 36/137 |

*Primary Examiner*—Denise L. Gromada
*Assistant Examiner*—Alfred Basichas
*Attorney, Agent, or Firm*—John C. Smith

[57] ABSTRACT

A lighting kit that provides indirect lighting for roller skates or skateboards by mounting a lighting assembly under the shoe section of the skate or underside of the skateboard and providing a light directed down from the bottom of the shoe section of the skate or underside of the skateboard to the floor under the user. The color of the lighting system can be altered by placing a color filter in front of the lamp. In an alternative embodiment the conventional lamps used in the first embodiment are replaced by electroluminescent (EL) lamps. The EL lamps provide a flat structure which is relatively unnoticeable to observers when the skate is in use and the lamps turned off because they are positioned flat against the bottom of the skate or skateboard. When the lamps are activated, they illuminate the floor beneath the skate but are not directly seen. The third embodiment provides flat EL lamp panels which removably attach to the sides of the skates or skateboards such that they can be used not only for aesthetic reasons but also to provide an effective safety measure. The kit can be manufactured with the skate or skateboard as an integral component.

17 Claims, 11 Drawing Sheets

INDIRECT LIGHTING SYSTEM FOR ROLLER SKATES AND SKATEBOARDS

BACKGROUND OF THE INVENTION

1. Technical Field

The present invention relates to lighting systems for use with roller skates and/or skateboards. In particular, it relates to indirect lighting systems which illuminate the floor under a roller skate or skateboard.

2. Background Art

Currently, a wide variety of wheeled amusement devices, such as skates and skateboards are used by young and old alike. In particular, roller skates have found wide use both indoor and outdoors in roller skating rings and for general use on streets and sidewalks.

Use of roller skates has led to some difficulty when used in poorly lit places such as darkened roller rinks or when used outdoors in the night. In areas such as indoor roller rinks the use of low level lighting generally does not lead to safety problems, but it can detract from the aesthetics of the activity. On the other hand, in outdoor use the absence of adequate lighting quite often does result in the exposure of the skater to danger from automobiles. Attempts have been made to provide some lighting capability to footwear and other devices used by pedestrians such as athletic shoes, roller skates, or skateboards.

In the case of athletic shoes, one of the methods used to enhance the visibility of the wearer has been to place lights in the heel and around the periphery of the athletic shoes. The lights used by this type of device are normally triggered by a switch in the heel of the shoe that automatically activates a light each time the user takes a step. The lights are ordinarily LEDs and are powered by a battery contained with the shoe. This type of lighting system has both ornamental value, and in addition, provides some safety value since the lights can improve the visibility of a pedestrian at night so long as the pedestrian is moving. Of course, if the pedestrian is standing still, the lights are normally off. A disadvantage of the device is that the light assembly is visible even when not in use.

Other known lighting methods use devices similar in structure to a flashlight which attaches to a shoe. These devices are typically used to illuminate the path in front of pedestrians while walking in the dark. An additional benefit is that the lights can make the user more noticeable by a driver from a distance.

Another type of device which has used lighting systems is the skateboard. It is known, for example, to put head light and tail light arrangements on skateboards both for forward illumination purposes and rear lighting. These devices can be configured as small flash light assemblies which mount on the underside of the skateboard. Likewise, rail bars are known which arrange LEDs around the periphery of the skateboard. Typically, these types of systems have switch and battery assemblies mounted on the underside of the skateboard.

Another device commonly used is roller skates. Attempts to provide lighting systems for this type of device have usually involved the attachment of a flash light device to provide a head light, or tail light function to roller skates. This type of lighting system typically attaches to the tow brake on the front of a roller skate or the underside of the skate at the rear. There have been known tow brakes that have led lighting arrangements built in to the tow brake on the front of the skate.

Another approach used in conjunction with roller skates has been to provide lighting in or on the wheels themselves. One such method includes making the light an integral part of the wheel. A second approach is to add on a device to the side of the wheel. This allows lights to be provided to pre-existing skates. However, in both of these configurations as well as the configuration that uses the tow brake, the lighting assemblies detract from the appearance of the roller skates and may also interfere with the use of the roller skates due to the size of the lighting assemblies. These configurations are suitable for the older type of roller skates whose wheels are configured in a square pattern with wheels in each of four corners. These wheels tend to be large and wide.

However, with the advent of the new roller skate design commonly known as in-line skates, the addition of lighting assemblies has increasingly detracted from the appearance of the skates and increasingly interferes with the use of the skates. This because in-line skates are configured similarly to ice skates rather than the conventional roller skates. The wheels are to small to hold batteries and of course the orientation of the lights into the wheels would still only provide direct lighting. The disadvantage of this wheel structure is that it would not have the ability to provide indirect lighting which for aesthetic reasons may be much more desirable. Likewise, the increased performance available from in-line skates may be hampered since the skater may not be able to tilt as far to the side if lights are mounted underneath.

In addition to the problems associated with the ability to incorporate lighting into in-line skates, there is also an additional problem associated with the ability to conveniently alter colors. The ability to changes colors is desirable since the choice of color may vary depending on the nature of the use. For example, if a skater is outdoors near automobile traffic the skater may wish to have a specific color such as red. In dark indoor environments such as a skating ring with dimmer lights another color may be more desirable.

Battery usage is another problem associated with many lighting systems used for roller skates. A typical lighting arrangements such as incandescent bulbs tend to consume considerable power, as do LEDs. Further LEDs often do not have the luminance necessary to effectively provide lighting capabilities indirectly. Therefore, arrangements which use LED lamps typically are implemented in direct lighting systems where the viewer looks directly at the lamps. Due to the rapid draining effect these devices have on their batteries, either large, heavy and inconvenient batteries must be used which may last for a more extended period, or lighter weaker batteries which drain faster must be used.

The prior art has failed to provide a single system which is capable of being inconspicuous when not in use, which provides for convenient change of color by the user, which provides indirect lighting, which has the ability to relocate the lighting on the skate or on a skateboard, and which has the inability to provide very low power systems which can operate for extended periods on a light weight battery.

SUMMARY OF THE INVENTION

The present invention overcomes the foregoing problems and disadvantages of the prior art with a system that provides indirect lighting by mounting a lighting assembly under the shoe and providing a light directed down from the bottom of the shoe section of the skate to the floor under the user. The color of the lighting system can be altered by placing a color filter in front of the lamp. In an alternative embodiment the incandescent lamps used in the first embodiment are replaced by electroluminescent lamps (EL lamps). EL lamps used in this embodiment tend to be very flat and are not noticeable to observers when the skate is in use and the lamps are turned off because they are positioned flat against the bottom of the skate or skateboard. The color of the EL lamp can be altered via a film color filter placed on top of the EL lamp or by selecting a particular color EL lamp. When the lamps are activated, they illuminate the floor beneath the skate but are not directly seen. The third embodiment provides flat EL lamp panels which removably attach to the sides of the skates such that they can be used not only for aesthetic reasons but also to provide an effective safety measure.

DESCRIPTION OF THE PREFERRED EMBODIMENT

Figure 1:
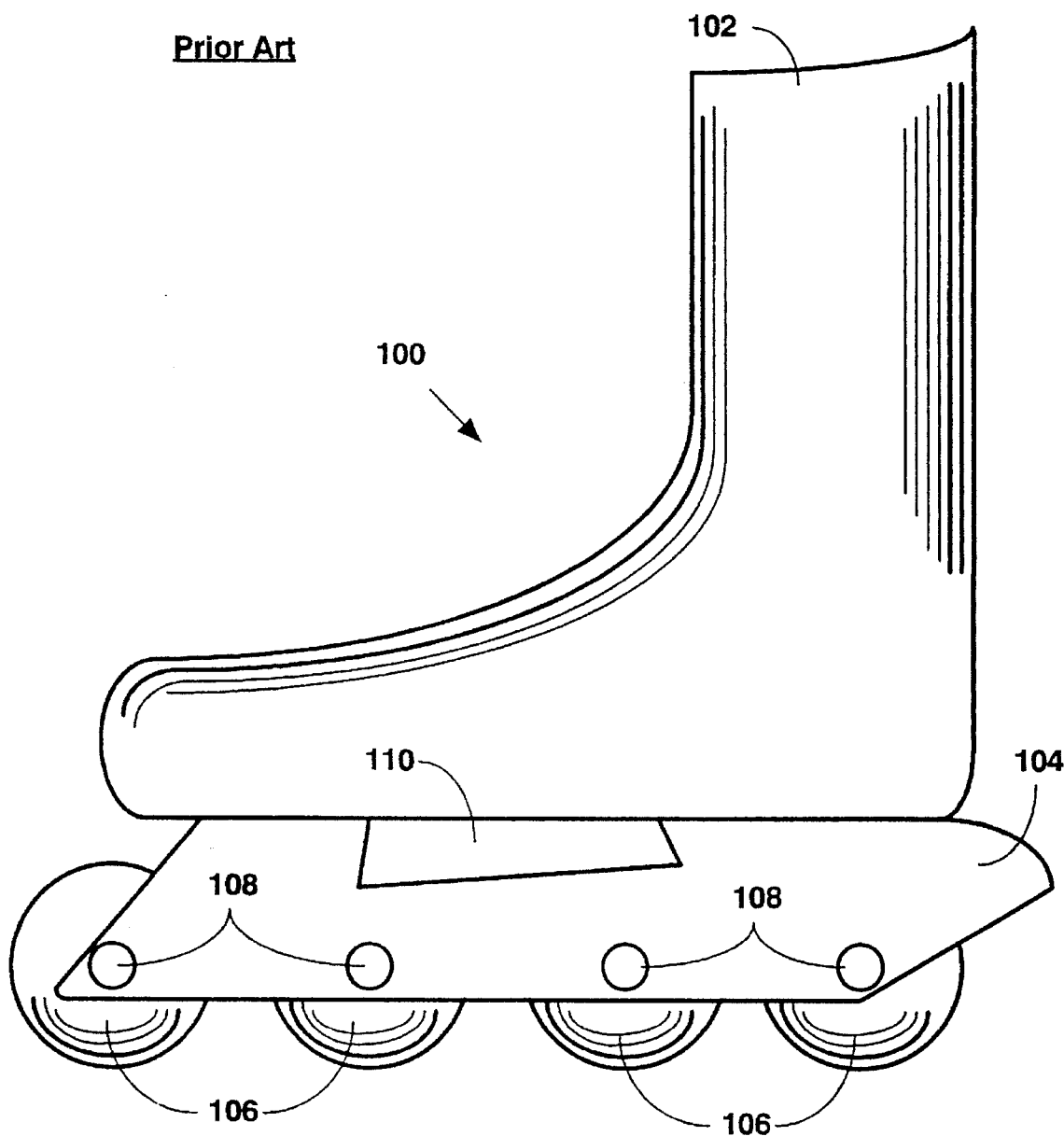
FIG. 1 shows prior art in-line skates.

In FIG. 1 a prior art in-line skate 100 is illustrated. In this configuration, the in-line skate 100 consists of an upper boot section 102 into which the user places his foot (hereinafter called the boot). A wheel rail 104 is attached to the bottom of boot 102. Four wheels 106 are attached to wheel rail 104 by axles 108. Aperture 110 is an open area between boot 102 and wheel rail 104. In the preferred embodiment, described below, the in-line skate 100 configuration shown in FIG. 1 is used to illustrate the invention. However, those skilled in the art will recognize that other configurations, such as a conventional square wheel configuration with wheels at each corner, can advantageously use the invention as well.

Figure 2:
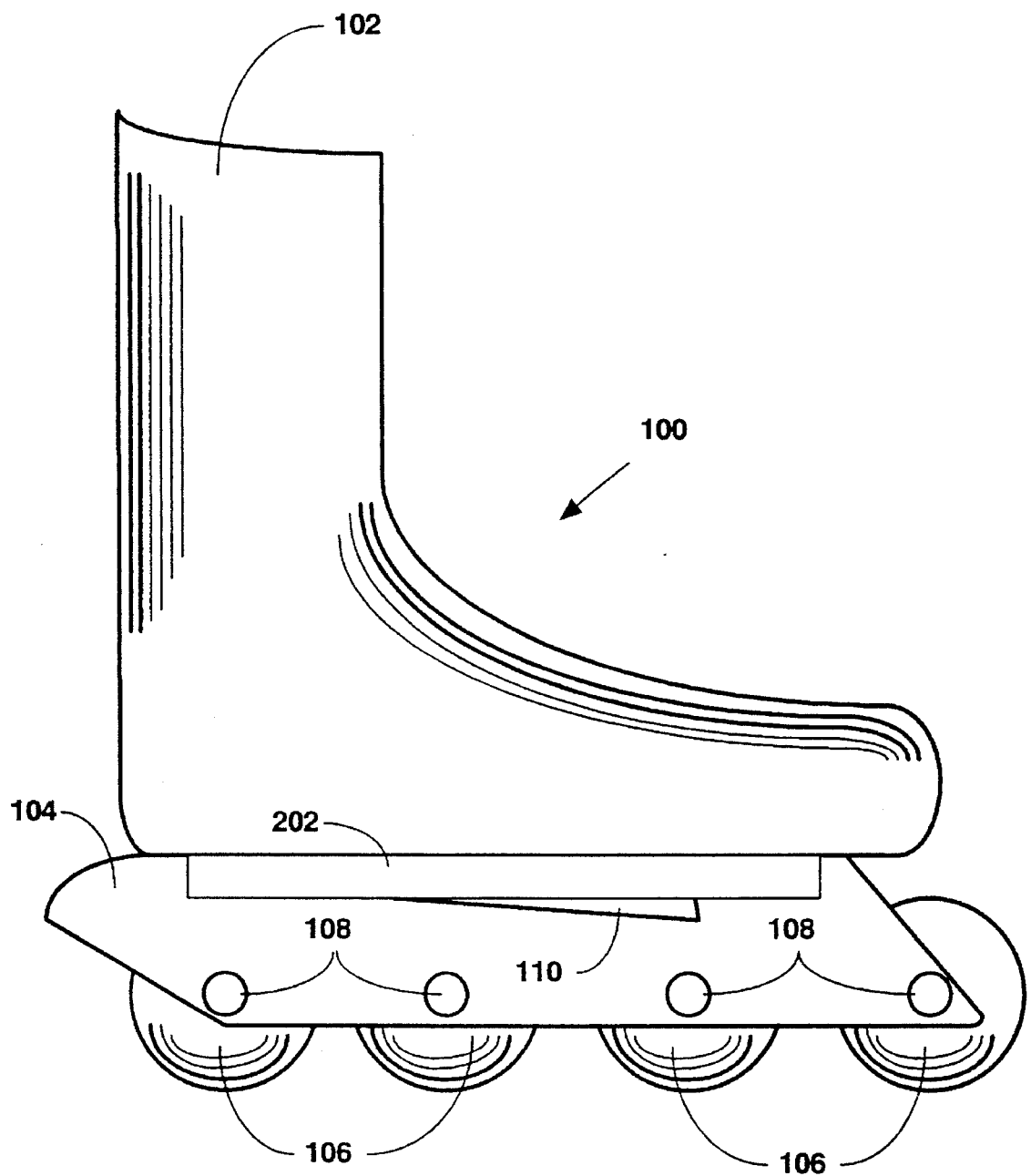
FIG. 2 shows the prior skate of FIG. 1 with the lamp kit of the present invention installed.

FIG. 2 is a side view which illustrates the prior art in-line skate 100 as shown in FIG. 1 with the additional feature of an indirect light generator attached to the underside of the boot 102. In this view, a light shield 202 surrounds the other components of the light generator and prevents direct viewing of light from a lateral direction. However, the light shield 202 does not prevent light from being projected down from the boot 102 to the floor, thereby allowing a bed of light to flood the floor beneath in-line skate 100. A more detailed discussion of the methods used to create the indirect lighting is discussed more fully below in regard to the other figures.

Light shield 202 is preferably constructed from a lightweight material such as plastic, etc. A flexible or semi-flexible material is preferred in order to mitigate damage from impacts which can happen during normal use of in-line skate 100. While the preferred embodiment envisions a light shield 202 which completely blocks light, those skilled in the art will recognize that light shield 202 can also be constructed from material which allows some light to penetrate through for direct lateral viewing. In the case where the material in light shield 202 is colored, light shield 202 acts as a color filter to produce a side light having a particular color. Light shield 202 is preferably removably attached to permit replacement with light shields 202 of any desired color. Attachment and removal methods for covers, shields, and like devices are well known in the art and can be accomplished by any suitable method such as a snap-on connectors, screws, etc. Providing for easy removal and replacement of the light shield 202 allows users to conveniently change the appearance of the in-line skate 100.

Figure 3:
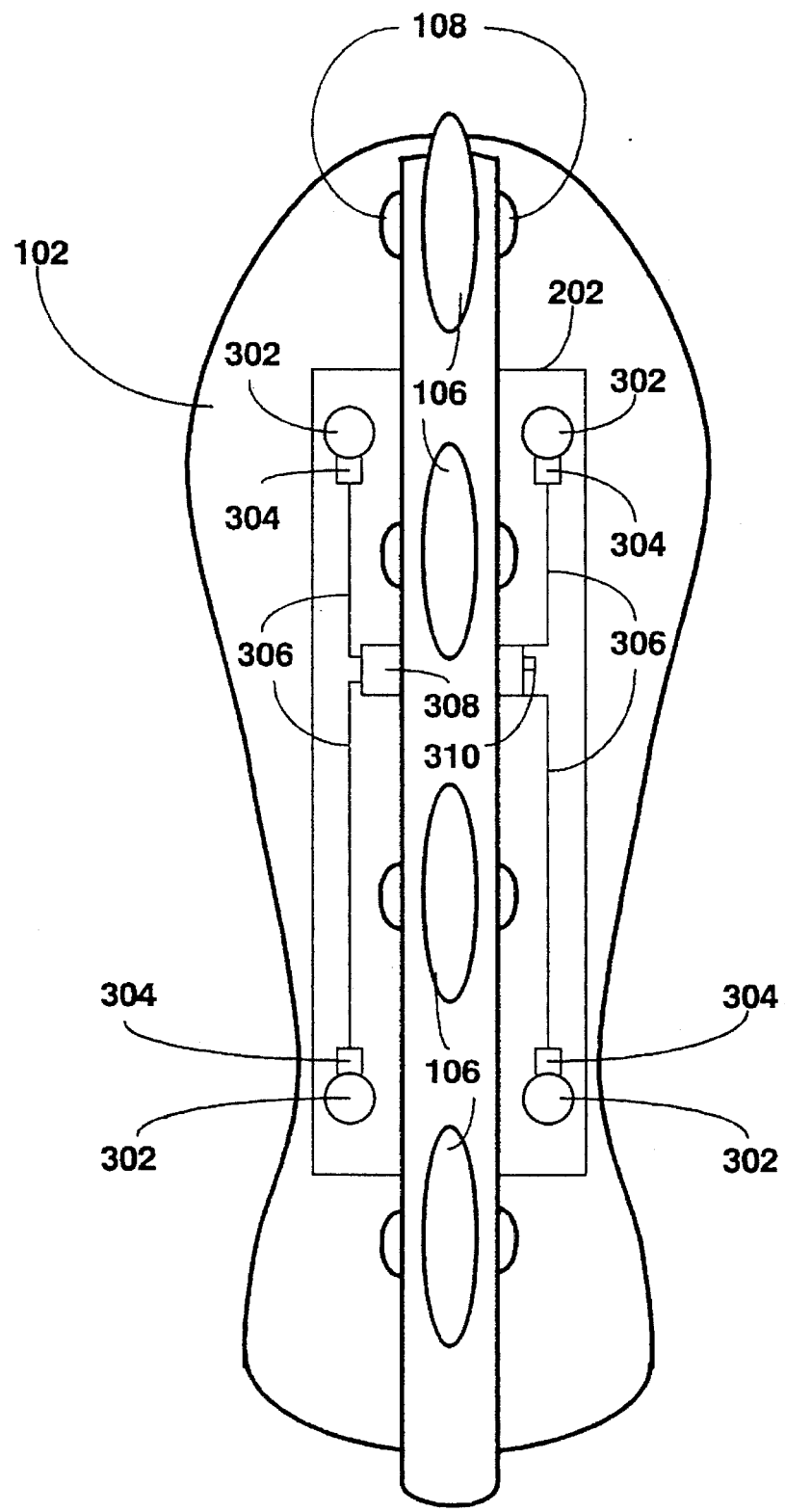
FIG. 3 shows a bottom view of the lamp kit of FIG. 2 installed on the prior art in-line skate.

FIG. 3 is a bottom view of the embodiment of FIG. 2. In this figure, light shield 202 is shown surrounding the components used to generate the indirect lighting. Lamps 302 are connected to sockets 304 which are in turn attached to power supply 308 via wires 306. Power to lamps 302 is controlled by switch 310. In the preferred embodiment, power supply 308 is typically a conventional battery. The lamps 302 are shielded from external view during use of in-line skate 100 by the light shield 202 which extends around the periphery. The light shield 202 is illustrated in FIGS. 2 and 3 as extending farther to the front and rear of boot 102 than aperture 110. By so doing, the area covered by the bed of light will be extended such that a larger bed of light floods the floor beneath in-line skate 100.

The lamps 302 can themselves have a particular color to create a particular visual effect. In the alternative, a color filter 402 (shown in FIG. 4) can be attached to the indirect light generator (which is comprised of lamps 302, sockets 304, wires 306, power supply 308, switch 310, and light shield 202) which results in the same effect. Preferably, the color filter 402 is a substantially flat, replaceable panel which attaches to the light generator and lies in the light path from the components of the light generator not already screened by light shield 202. Those skilled in the art will recognize that various changes can be made to the design of the indirect light generator. For example, the light shield 202 and the color filter 402 can be a single unit. Likewise, a variety of attachment means, well known in the art, can be used to attach the components of the indirect light generator to the in-line skate 100.

For ease of illustration, switch 310 is illustrated as a simple on/off switch. However, alternative embodiments can be easily implemented which provide more flexibility. For example, switching means can be attached which provide for flashing of the lamps 302 under control of a timer. Likewise, if the lamps 302 each have a different color, color control switching means can be used to selectably switch the different colored lamps 302 on and off to produce any desired effect. The type of switching and/or control mechanisms necessary to switch lamps 302 on and off as well as the controls necessary to selectably activate individual lamps 302 are well known in the art and can easily be implemented by hardware and/or software as an integrated circuit, prom, eprom, etc. Further, the incandescent lamps 302 used in FIGS. 2 and 3 can be implemented as neon lights, or LEDs.

The number of lamps 302 used is not critical and may vary so long as the battery selected for power supply 308 is capable of illuminating the number of lamps 302 used for a particular design. The battery used by this embodiment is a commonly used 9 volt DC battery. Those skilled in the art will recognize that any suitable substitute for the battery can be used. For example, the power can be produced by attaching a small generator to one or more of the wheels (production of power in this manner is known in the art). Likewise the switch can be any suitable switch for this type of power supply. Finally, FIGS. 2 and 3 have illustrated how an add-on lighting kit can be retrofitted to an existing skate by fitting the components of the indirect light generator within the aperture 110 of the wheel rail 104 where possible. However, if an indirect lighting generator is designed to be manufactured as part of the in-line skate 100, then the various components such as wheel rail 104 can be easily designed to conceal the components of the indirect lighting generator for a more pleasing appearance.

Figure 4:
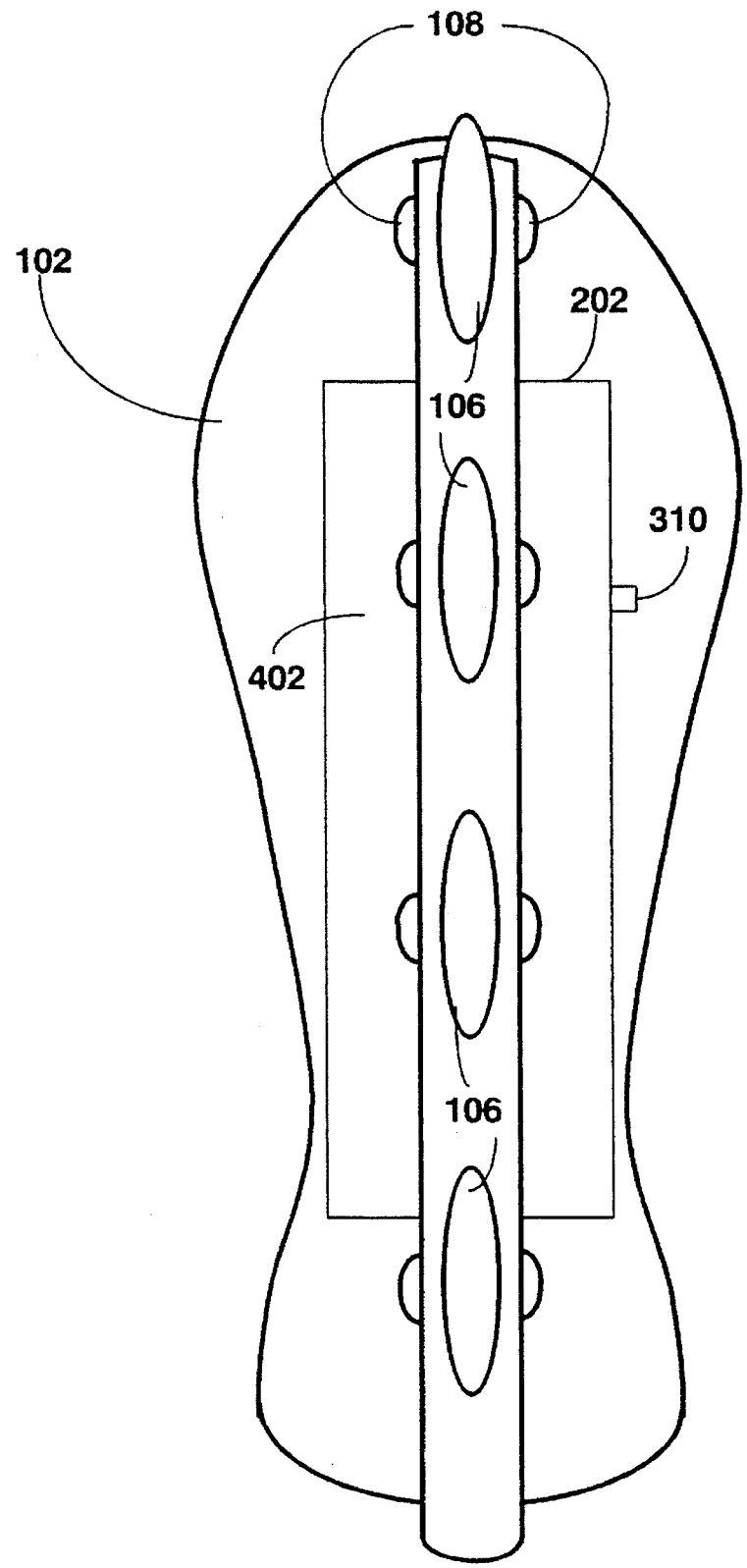
FIG. 4 shows a close up of the lamp kit of the present invention with a removable color filter for changing colors.

FIG. 4 shows the embodiment of FIGS. 2 and 3 with the color filter 402 in place. Those skilled in the art will recognize that any suitable attachment means can be used to attach color filter 402. In the preferred embodiment, a quick disconnect attachment is used for color filter 402 to allow easy change of colors.

Figure 5:
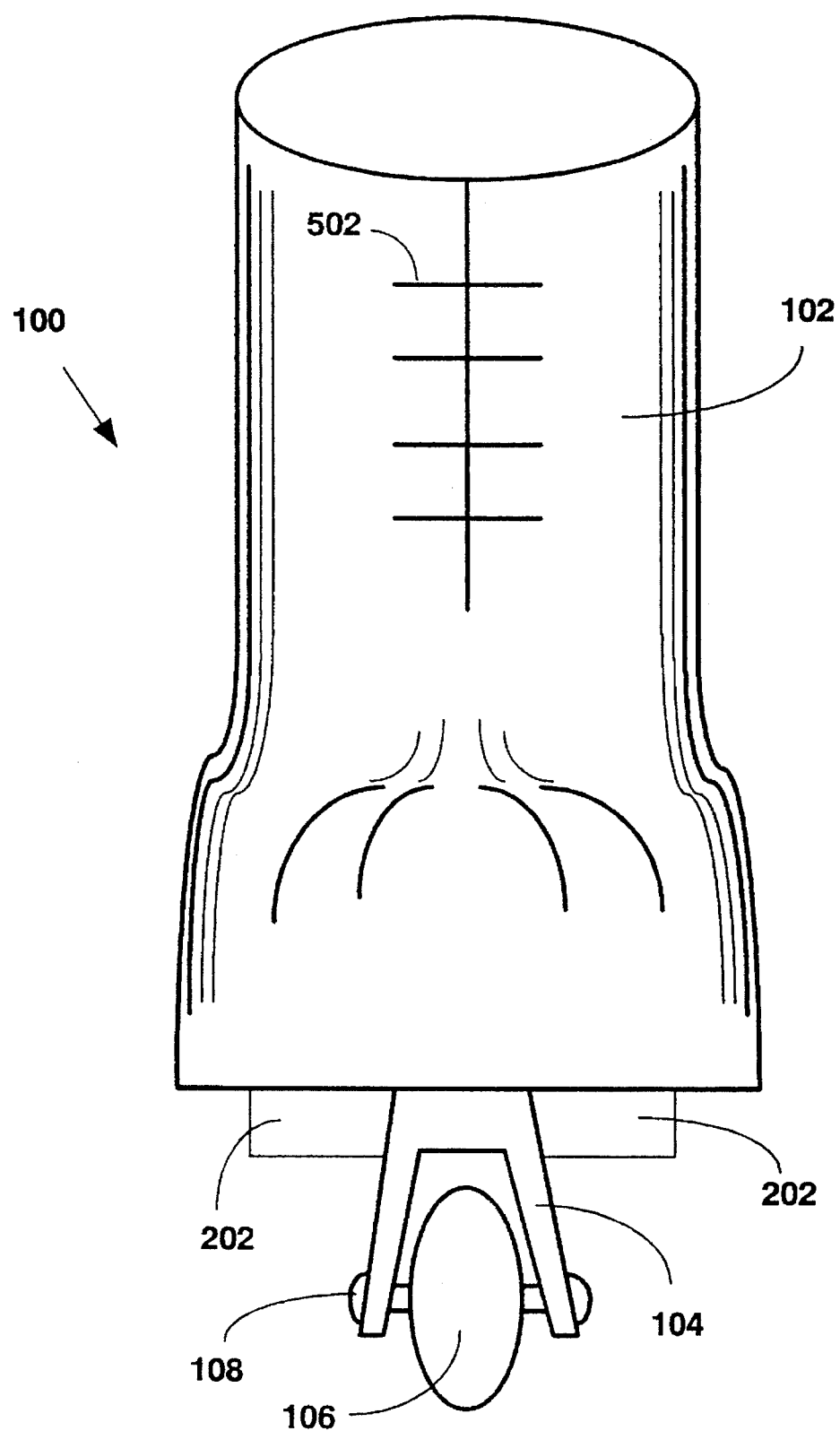
FIG. 5 shows the device of FIG. 2 from a front view illustrating a preferred location of the lamp kit.

Referring to FIG. 5, this figure shows a front (toe) view of the in-line skate 100, including boot 102, wheel rail 104, wheel 106, axle 108, light shield 202 and boot laces 502. This view illustrates the appearance of in-line skate 100 with light shield 202 attached. In this embodiment, wheel rail 104 is shown dividing light shield 202. However, the size of light shield 202 is not critical and may extend past the ends of wheel rail 104 such that light shield 202 appears to be a single unit. As can be seen, during normal use, light shield 202 blocks lateral viewing of the light produced by lamps 302. light shield 202 is shown as not protruding all the way to the edge of the boot. The reason for this is that light shield 202 should not interfere with the skaters use of the in-line skate 100 such as when turning. In addition, another advantage of the inward position of light shield 202 is that by locating light shield 202 inward from the edge of the boot 102 the ability of an observer to notice it is decreased.

Figure 6:
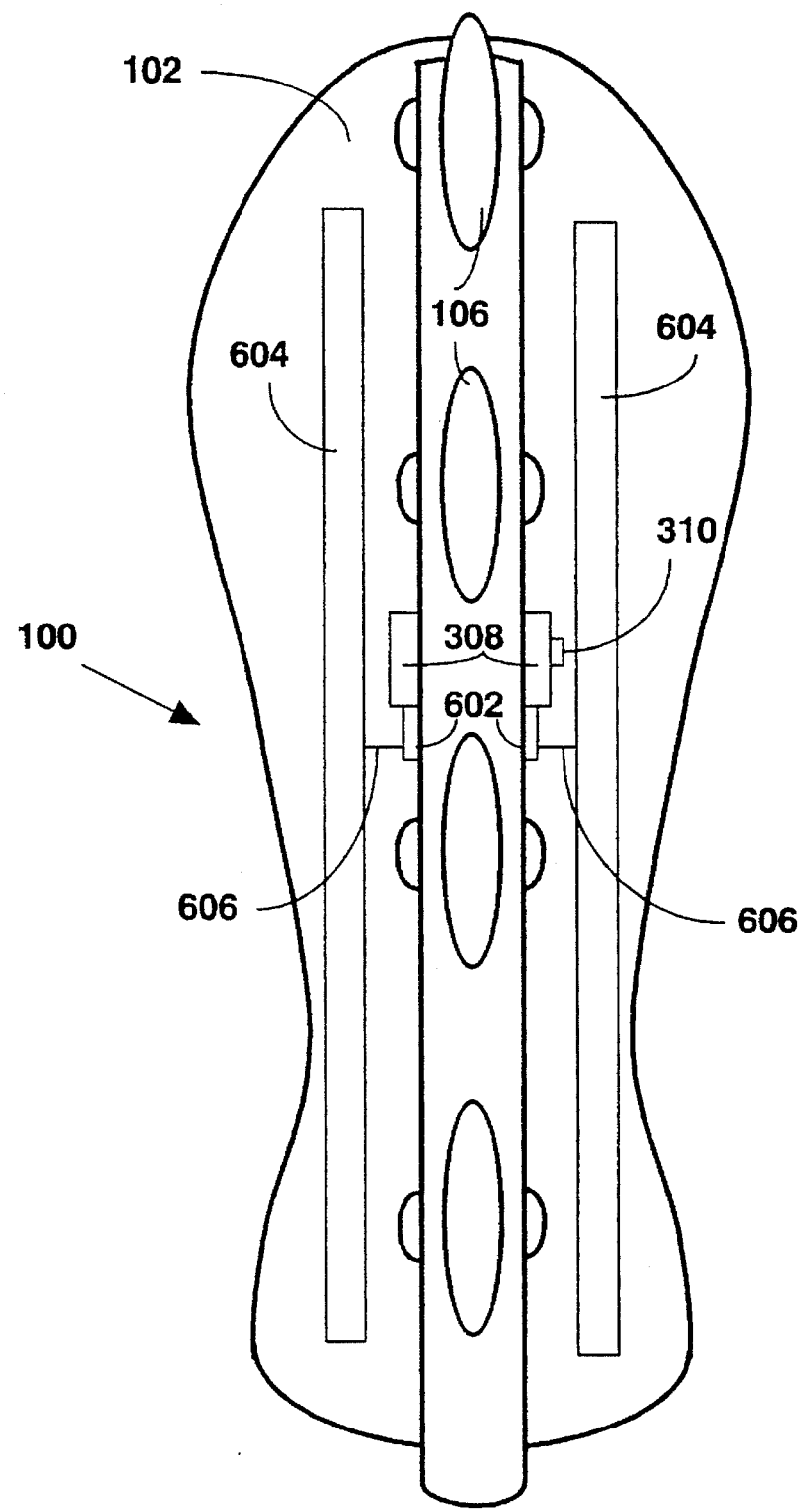
FIG. 6 shows a bottom view of an alternative embodiment which uses electroluminescent lamps in place of the incandescent lamps of the forgoing embodiments.

FIG. 6 illustrates an alternative embodiment of the invention. This figure shows a bottom view of the in-line skate 100. The lamps used by this embodiment are electroluminescent lamps 604. These electroluminescent lamps 604 are powered by AC power output by DC inverter 602 via wires 606. DC inverter 602 in turn receives its power from DC battery 308 under control of switch 310. A principle advantage of this embodiment is that electroluminescent lamps 604 can be attached flat against the bottom surface of boot 102 such that they are not noticeable to a viewer from a lateral direction and do not require a light shield 202. Further, electroluminescent lamps 604 can be designed to cover as much of the boot 102 surface as desired.

In kit form, the electroluminescent lamps 604 can be attached to existing in-line skates 100 via conventional attachment means such as adhesive or double stick tape. Further, by using removable attachment means, such as double stick tape, hook and loop material, or the like, electroluminescent lamps 604 of one color can be replaced with electroluminescent lamps 604 of another color, thereby allowing a user to conveniently change the color of the light projected onto the floor beneath the in-line skate 100. Those skilled in the art will recognize that the color projected by the electroluminescent lamp 604 can also be changed by placing a translucent color filter, such as a film, over the light emitting surface of the electroluminescent lamp 604.

When designed as an integral part of an in-line skate 100 rather than as an add-on kit, the indirect light generator can be made such that it is not visible to a lateral viewer. For example, the battery 308, DC inverter 602, and switch 310 can be concealed within wheel rail 104. Likewise, electroluminescent lamps 604 and wires 606 can be recessed into the lower surface of boot 102 such that they are not directly visible from a lateral vantage point as is the case during normal use.

Figure 7:
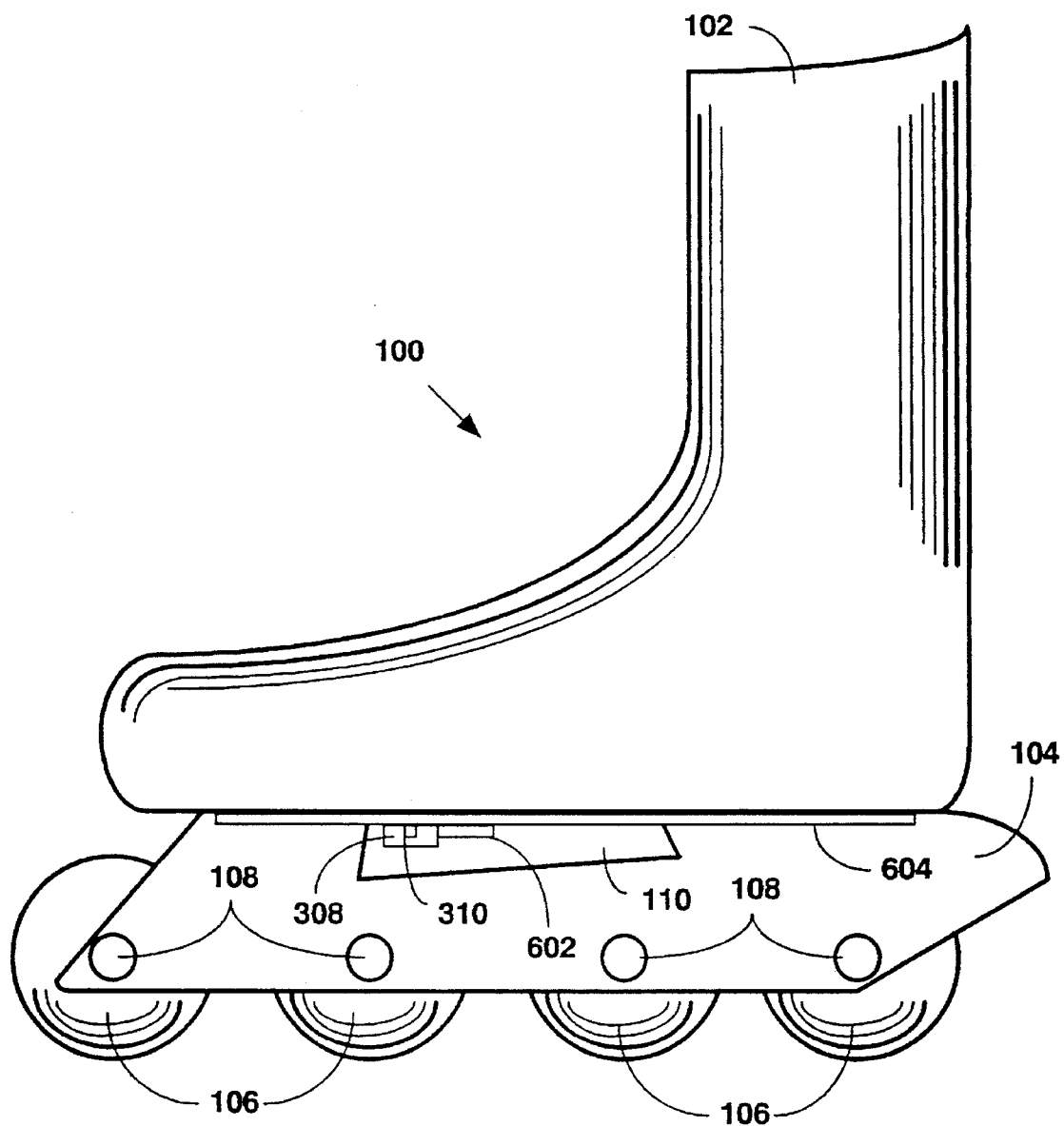
FIG. 7 shows the side view of the electroluminescent strips as shown in FIG. 6.

Regarding FIG. 7, this figure shows a side view of an add-on kit form of the embodiment discussed in FIG. 6. As can be seen, the electroluminescent lamps 604 provide a very low profile. As a result, light shield 202 is not required for this embodiment. In the add-on kit form, the outer edge of electroluminescent lamp 604 may be coated with a paint or other light blocking film to prevent direct lateral viewing of emitted light. Of course, in the case of an in-line skate 100 with an integral indirect lighting system, the electroluminescent lamps 604 can be recessed into the bottom surface of the boot 102 such that no treatment of the edge of the electroluminescent lamp 604 is necessary. These electroluminescent lamps 604 can be sized to fit substantially the entire bottom of the boot 102 or any other convenient size for the user. The battery power system is shown in the same place it was with earlier embodiments with the switch assembly also mounted in the rail with the battery. This also allows convenient access by the user and allows and inconspicuous placement.

Those skilled in the art will recognize that electroluminescent (EL) lamps 604 are well known in the art and commercially available from a variety of sources. For example, suitable EL lamps and matching DC inverters can be obtained from several manufacturers such as BKL, Inc. a corporation in King of Prussia, Pa. USA.

EL lamps typically produce a specific color when illuminated by an AC signal. For portable usage, such as with a roller skate or skateboard, a battery makes a suitable power source for the DC inverter. Commercially available DC to AC inverters typically have an input voltage of 1.5 to 28 volts DC. Typical output ranges of DC inverters are 25 to 180 volts AC, and output frequencies range from 100 Hz to 5000 Hz.

Output of EL lamps are matched to a specific DC inverter to achieve maximum desired effect and maximum efficiency. Typically, DC inverters are selected based on the size of the EL lamp, brightness desired, and lamp-life considerations. The higher the output voltage and/or frequency of the DC inverter, the brighter the lamp.

EL lamps and DC inverters are well known in the art. But as a practical matter, the selection of the DC inverter, the type of battery, and the particular EL lamp chosen will be based on practical considerations such as the amount of surface area available to mount the EL lamp on, and the color and amount of brightness desired. Selection will also depend on the intended use, such as outdoors, where luminance may be more important for safety reasons, and indoor use where the color selected may have greater importance. Therefore, the selection of a particular size DC inverter and EL lamp surface area will typically be a design choice.

The following table illustrates a typical manufacturer's EL lamp performance based on applied voltage and frequency and their effect on luminance:

| Type | Color | Volt. (VAC) | Freq. (Hz) | Lum. (Ft-L) | Lum. (Cd/M2) |
| --- | --- | --- | --- | --- | --- |
| Low Power Long Life | White | 40 | 2000 | 5.3 | 18.2 |
| Low Power Long Life | White | 90 | 650 | 25.0 | 85.7 |
| Low Power Long Life | White | 120 | 400 | 31.0 | 106.2 |
| Low Power Long Life | Aviation Green | 40 | 2000 | 8.5 | 29.1 |
| Low Power Long Life | Aviation Green | 90 | 650 | 32.0 | 109.6 |
| Low Power Long Life | Aviation Green | 120 | 60 | 8.0 | 27.4 |
| Low Power Long Life | Aviation Green | 120 | 400 | 36.0 | 123.3 |
| Low Power Long Life | Blue Green | 120 | 400 | 29.0 | 99.4 |
| Low Power Long Life | Yellow Green | 120 | 400 | 36.0 | 123.3 |
| High Power Short Life | White | 120 | 400 | 26.0 | 89.1 |
| High Power Short Life | Aviation Green | 40 | 2000 | 4.5 | 15.4 |
| High Power Short Life | Aviation Green | 120 | 400 | 28.0 | 95.9 |
| High Power Short Life | Blue Green | 120 | 400 | 28.0 | 95.9 |
| High Power Short Life | Green | 40 | 2000 | 6.0 | 20.6 |
| High Power Short Life | Green | 120 | 400 | 28.0 | 95.9 |

Figure 8:
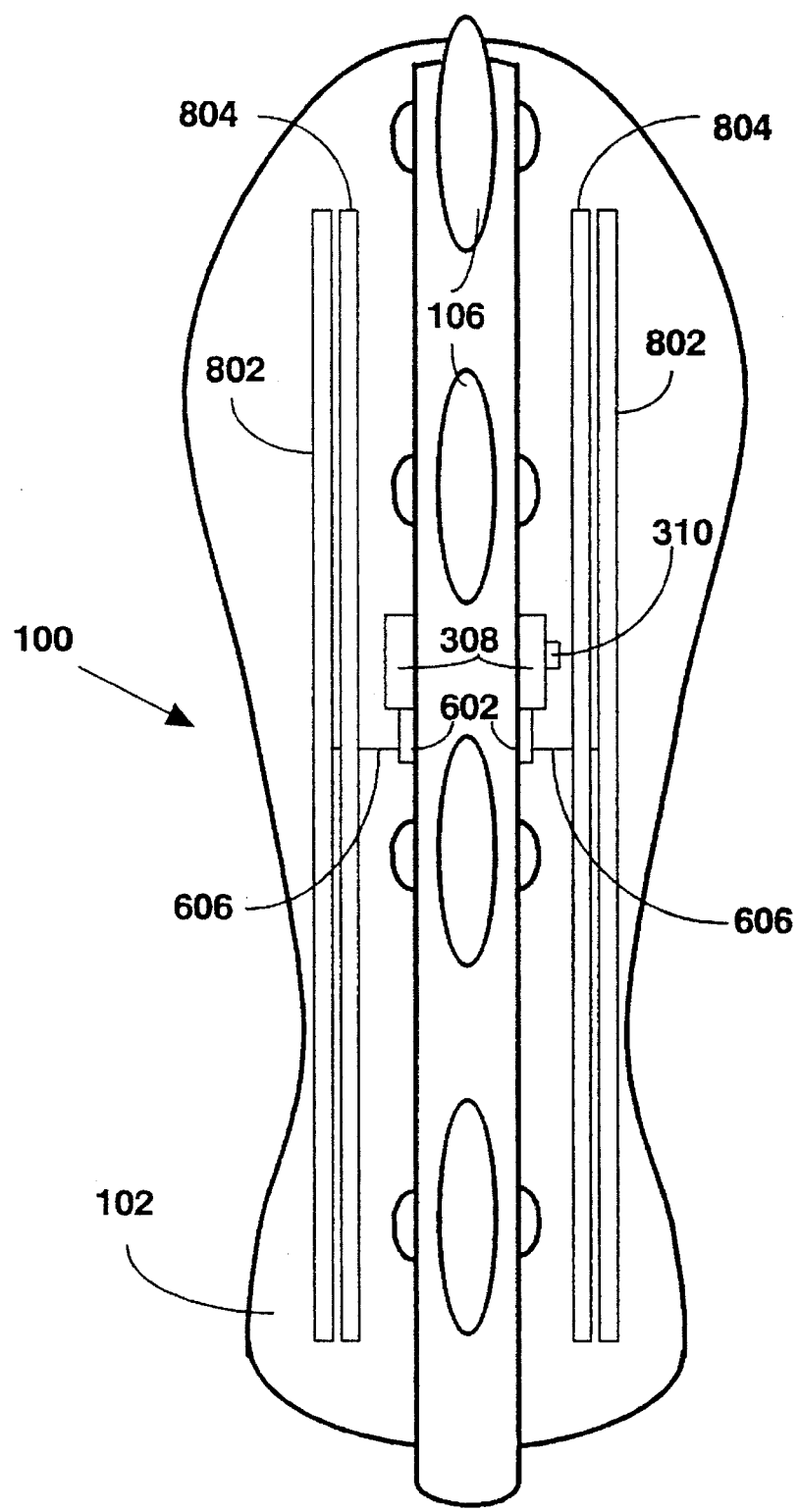
FIG. 8 is a bottom of the embodiment of FIG. 6 showing an electroluminescent lamp with multiple portions.

FIG. 8 shows an alternative embodiment of the invention shown in FIGS. 6 and 7. In this embodiment, electroluminescent lamps 604 are divided into separate portions 802 and 804. As was the case above, battery 308 provided power under control of switch 310. The DC power provided by battery 308 is input to DC inverter 602 which in turn outputs high voltage AC power to illuminate electroluminescent lamps 802, 804. The difference in this embodiment is that the power output by DC inverter 602 is selectably applied to one or more of electroluminescent lamps 802, 804 by lamp controller 806 by actuating switches (not shown) on lamp controller 806. By so doing, the user can take advantage of several features. For example, if electroluminescent lamps 802 and 804 emit different colors, then the user can conveniently change the color of the indirect light which illuminates the floor under the in-line skate 100. Likewise, lamp controller 806 can be equipped with a timer or with a programmable device such as a prom, eprom, etc to vary emitted colors automatically. Alternatively, if electroluminescent lamps 802, 804 are the same color, the lamp controller 806 can be used to selectably vary the number of electroluminescent lamps 802, 804 activated at any point in time, thereby varying the intensity of the indirect light under the in-line skate 100. Of course, combinations of color and light intensity can be simultaneously achieved either through manual switching or automatic programmed control by lamp controller 806.

Figure 9:
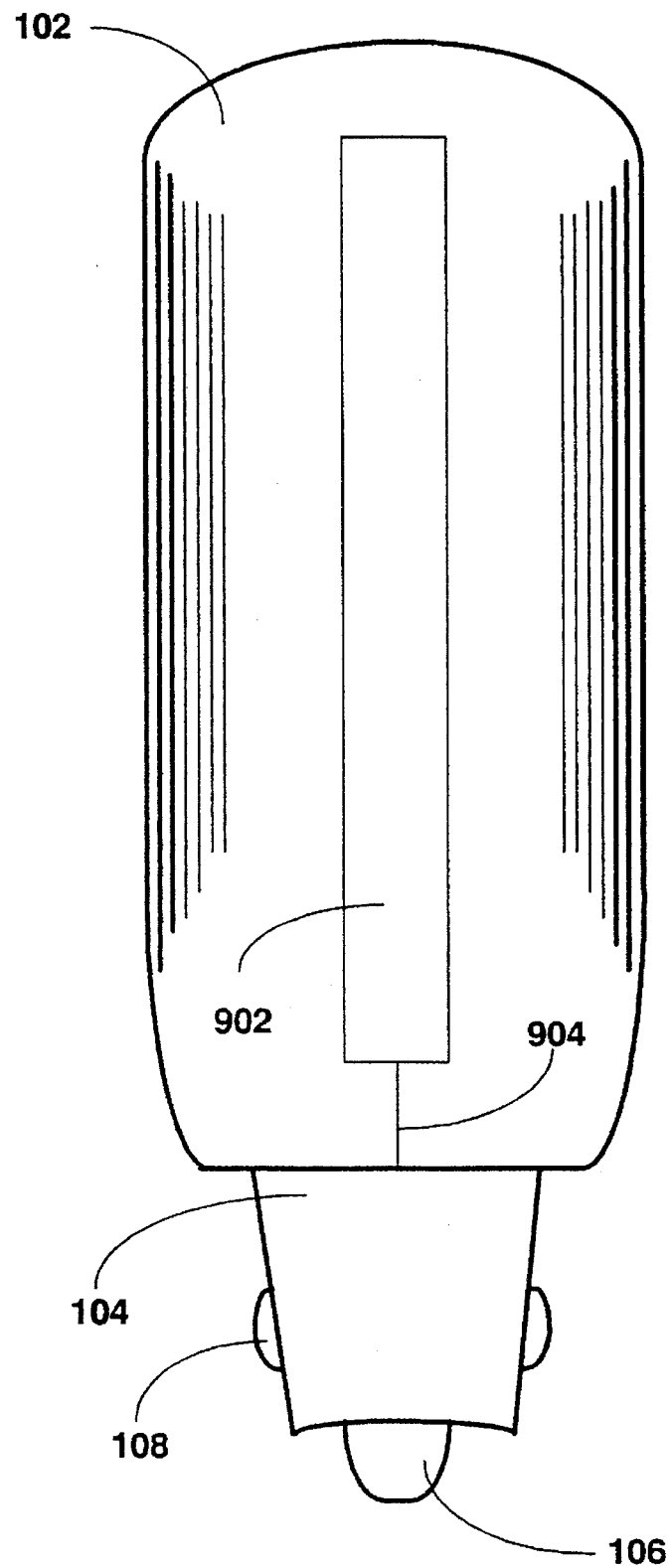
FIG. 9 illustrates a side mounted electroluminescent lamp system which is used as a safety warning when the skater is outdoors.

FIG. 9 illustrates an alternative embodiment in which an electroluminescent lamp 904 is used to produce directly visible light on the side of boot 102. Power is provided via wires 904 connected to DC inverter 602. Of course, when manufactured as an integral unit rather than as an add-on kit, the wires 904 can be imbedded into the boot 102 wall such that they are invisible. Likewise, the location, color, and number of electroluminescent lamps 902 can vary as well as the pattern of illumination which can be optionally varied by lamp controller 806. While the indirect lighting produced by the previous embodiments provided enhanced aesthetic value, the advantage of placing the electroluminescent lamps 902 on the upper portion of the boot 102 is increased safety. When using the in-line skates 100 outdoors and at night, electroluminescent lamps 902 can provide a much larger area of illumination which was heretofore impossible with previous lighting technologies. By increasing the relative area of illumination, the skater is much more visible to drivers in dark outdoor areas, thereby providing enhanced warning to the vehicle driver of the presence of a skater.

Figure 10:
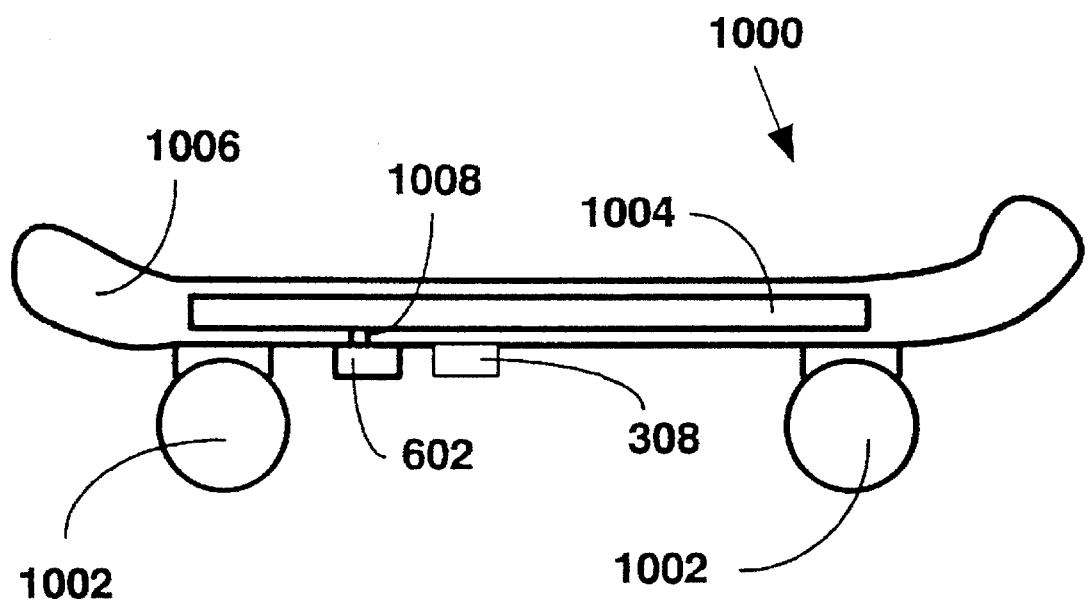
FIG. 10 illustrates a side view of an alternative embodiment in which the electroluminescent lamp kit is used on a skateboard.

FIG. 10 shows an alternative embodiment in which the electroluminescent lamp 1004 is used to provide safety illumination substantially along the side edge of a skateboard. As was the case above, battery 308 provided DC voltage to a DC inverter 602 which in turn outputs high voltage AC via wires 1008 to electroluminescent lamp 1004. The skateboard 1000 is constructed from board 1006 and wheel assemblies 1002. The same kit which was used to add indirect lighting to the in-line skates 100, discussed above, can be used with skateboard 1000 as shown in FIG. 10 or used to provide indirect lighting in the same manner as was done above with in-line skate 100.

Figure 11:
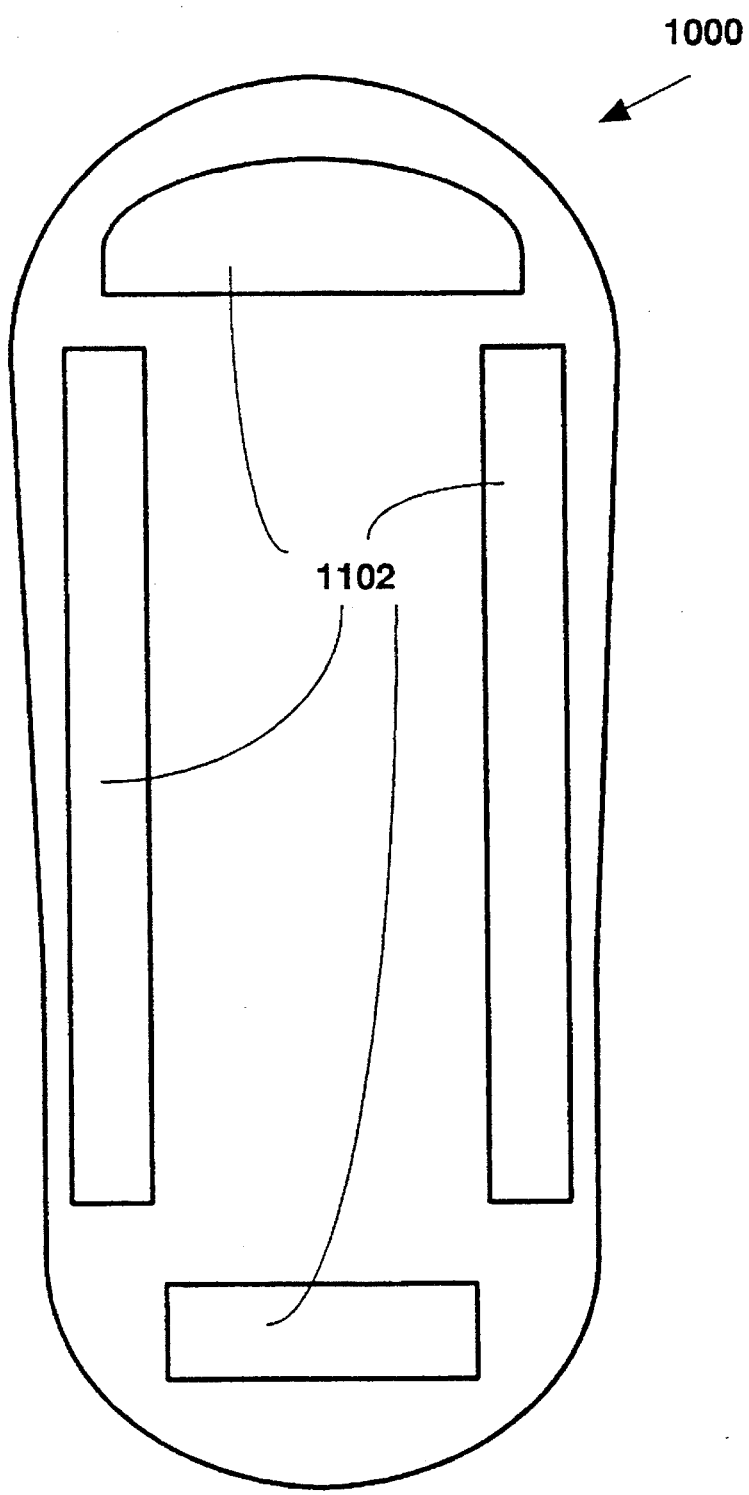
FIG. 11 illustrates a top view of an alternative embodiment in which the electroluminescent lamp kit is used on a skateboard.

FIG. 11 illustrates a top view of another embodiment in which the electroluminescent lamps 1102 are used to illuminate large areas of the surface of a skateboard 1000. For ease of illustration, the power supply, wiring, and other hardware, are not illustrated to better illustrate the placement of the electroluminescent lamps 1102. The electroluminescent lamps 1102 can be attached to the upper or lower surfaces of the skateboard 1000. Likewise the same type of color and intensity manipulation can be used with this embodiment as was used with the previously discussed embodiments.

While the invention has been described with respect to a preferred embodiment thereof, it will be understood by those skilled in the art that various changes in detail my be made therein without departing from the spirit, scope, and teaching of the invention. For example, the EL lamps can be made as an integral part of the skate or as a removable lamp which allows the user to conveniently change colors. The size of the lamp can vary. The location or the DC battery and DC inverter does not have to be located under the boot as shown in the drawings and can be located in any convenient location, and may even be imbedded in the wall of the boot for aesthetic reasons. Accordingly, the invention herein disclosed is to be limited only as specified in the following claims.

We claim:

1. A lighting kit for generating indirect lighting for roller skates, comprising:

an indirect light generator mounted to the roller skate such that indirect light from the light generator is visible and indirect light from the light generator is obstructed from a lateral view during normal use;

a power source connected to the indirect light generator; and attachment means for attaching the indirect light generator and the power source to a roller skate.

2. A lighting kit, as in claim 1, wherein:

the indirect light generator is an electroluminescent lamp; and the power source includes a battery power supply and a DC inverter, the battery power supply inputting DC power into the DC inverter and the DC inverter outputting AC power to the power input of the electroluminescent lamp.

3. A lighting kit, as in claim 1, further comprising:

a light shield substantially surrounding the lateral edges of the indirect light generator, the light shield further substantially inhibits light from the indirect light generator from direct viewing during normal use and does not obstruct viewing of indirect light emitted from the indirect light generator;

the indirect light generator is a battery powered light source;

the battery powered light source is selectably activated by switch means; and a removably attachable color filter having a preselected color attached to the light shield in the path of the indirect light such that the color of the indirect light is selectably controlled.

4. A lighting kit, as in claim 2, further comprising a switch attached to the output of the battery power supply such that the indirect light generator can be selectably activated.

5. A lighting kit, as in claim 4, further comprising attachment means for attaching the lighting kit to a roller skate.

6. A lighting kit, as in claim 2, wherein the electroluminescent lamp has a plurality of separate portions, each portion capable of being independently illuminated.

7. A lighting kit, as in claim 6, further comprising:

illumination control means attached to the output of the battery power supply and to the indirect light generator such that the separate portions of the electroluminescent lamp can be selectable activated;

at least one portion of the electroluminescent lamp illuminates has a first color and at least one other portion of the electroluminescent lamp has a second color when illuminated; and attachment means for attaching the lighting kit to a roller skate.

8. A lighting kit, as in claim 7, wherein the illumination control means includes means to switch colors by selecting differently colored portions of the electroluminescent lamp.

9. A lighting kit, as in claim 7, wherein the illumination control means includes means to vary light intensity by varying the number of portions of the electroluminescent lamp which are simultaneously illuminated.

10. A lighting kit, as in claim 7, wherein the illumination control means includes a timer to selectably control activation of the electroluminescent lamp according to a preselected time interval.

11. A roller skate with indirect lighting, comprising:

a skate, further comprising an upper shoe portion, a bottom shoe surface, and a wheel assembly attached to the bottom shoe surface;

an indirect light generator attached to the skate such that light directed in a substantially downward direction to the floor during normal use, further, the light generator is mounted to the roller skate such that indirect light from the light generator is visible and indirect light from the light generator is obstructed from a lateral view during normal use; and a power source connected to the indirect light generator.

12. A lighting kit, as in claim 11, wherein:

the indirect light generator is an electroluminescent lamp;

the power source includes a battery power supply and a DC inverter, the battery power supply inputting DC power into the DC inverter and the DC inverter outputting AC power to the power input of the electroluminescent lamp; and a switch is attached to the output of the battery power supply such that the indirect light generator can be selectably activated.

13. A lighting kit, as in claim 12, wherein the electroluminescent lamp has a plurality of separate portions, each portion capable of being independently illuminated.

14. A lighting kit, as in claim 13, further comprising:

illumination control means attached to the output of the battery power supply and to the indirect light generator such that the separate portions of the electroluminescent lamp can be selectably activated; and at least one portion of the electroluminescent lamp illuminates has a first color and at least one other portion of the electroluminescent lamp has a second color when illuminated.

15. A lighting kit, as in claim 14, wherein the illumination control means includes means to switch colors by selecting differently colored portions of the electroluminescent lamp.

16. A lighting kit, as in claim 14, wherein the illumination control means includes means to vary light intensity by varying the number of portions of the electroluminescent lamp which are simultaneously illuminated.

17. A lighting kit, as in claim 14, wherein the illumination control means includes a timer to selectably control activation of the electroluminescent lamp according to a preselected time interval.

* * * * *